US011707025B2

(12) United States Patent
Hartman

(10) Patent No.: US 11,707,025 B2
(45) Date of Patent: Jul. 25, 2023

(54) METHOD AND APPARATUS FOR MIXING GROW MEDIA AND ADDMIXTURES WITH A POLYMER FOR SPRAYING ONTO SURFACES FOR THE GROWING OF PLANTS AND THE MANAGEMENT OF WATER

(71) Applicant: Gary R Hartman, Hollister, CA (US)

(72) Inventor: Gary R Hartman, Hollister, CA (US)

(73) Assignee: International Horticultural Technologies, LLC, Hollister, CA (US)

( * ) Notice: Subject to any disclaimer, the term of this patent is extended or adjusted under 35 U.S.C. 154(b) by 1160 days.

(21) Appl. No.: 16/271,758

(22) Filed: Feb. 8, 2019

(65) Prior Publication Data

US 2020/0253137 A1   Aug. 13, 2020

(51) Int. Cl.
| | |
|---|---|
| *A01G 24/00* | (2018.01) |
| *E06C 1/34* | (2006.01) |
| *A01C 15/00* | (2006.01) |
| *B05B 9/00* | (2006.01) |
| *A01C 23/04* | (2006.01) |
| *E01C 9/00* | (2006.01) |
| *A01G 20/00* | (2018.01) |
| *A01G 9/033* | (2018.01) |

(Continued)

(52) U.S. Cl.
CPC .............. *A01G 24/00* (2018.02); *A01C 15/00* (2013.01); *A01C 23/047* (2013.01); *A01G 9/025* (2013.01); *A01G 9/028* (2013.01); *A01G 9/033* (2018.02); *A01G 20/00* (2018.02); *B05B 9/002* (2013.01); *E01C 9/004* (2013.01); *E06C 1/345* (2013.01); *A01C 7/06* (2013.01); *A01G 31/00* (2013.01)

(58) Field of Classification Search
CPC ........ A01G 24/00; A01G 9/025; A01G 9/028; A01G 9/033; A01G 20/00; A01G 2013/00; A01G 13/00; A01G 13/0262; A01G 24/20; B05B 7/04; B05B 7/0408; B05B 7/26; A01C 23/047; A01C 7/06
USPC ......................... 405/302.4; 47/77, 65.9, 48.5
See application file for complete search history.

(56) References Cited

U.S. PATENT DOCUMENTS

| | | | | |
|---|---|---|---|---|
| 5,082,500 A | * | 1/1992 | Nachtman | B01F 25/53 47/9 |
| 5,556,033 A | * | 9/1996 | Nachtman | B09B 1/004 239/10 |

(Continued)

FOREIGN PATENT DOCUMENTS

| | | | | | |
|---|---|---|---|---|---|
| EP | 3276077 A1 | * | 1/2018 | ............. | A01G 20/00 |
| WO | WO-2005002323 A1 | * | 1/2005 | ............. | A01G 20/10 |

*Primary Examiner* — Yvonne R Abbott-Lewis
(74) *Attorney, Agent, or Firm* — JRG Attorneys at Law

(57) ABSTRACT

The invention taught is a method and apparatus to mix a special polymer, hot water or other hot water material containing additives and a special mixture of dry growing substances mixed in a particular way so that they may be applied to structures such as to ceilings, walls, and any grade of vertical slants, commercial roofs, courtyards, indoor and outdoor applications. The purpose is to coat any surface and grow any plant for any reason be it erosion control, beautification of an area. The invention would help in reforestation after fires and such. This invention has a wide range of applications and so it is impossible to limit it to just one of these applications. Green parking lots and green areas that before could not be made green is just one area for the invention.

19 Claims, 11 Drawing Sheets

(51) Int. Cl.
*A01G 9/02* (2018.01)
*A01G 31/00* (2018.01)
*A01C 7/06* (2006.01)

(56) References Cited

U.S. PATENT DOCUMENTS

| | | | | |
|---|---|---|---|---|
| 5,849,364 | A * | 12/1998 | Nachtman | C09K 17/52 427/407.1 |
| 5,942,029 | A * | 8/1999 | Spittle | C09K 17/52 523/132 |
| 6,360,478 | B1 * | 3/2002 | Spittle | C09K 17/52 47/9 |
| 6,806,298 | B1 * | 10/2004 | Nachtman | C09D 101/284 521/122 |
| 7,284,930 | B2 * | 10/2007 | Shi | B09B 1/004 405/129.95 |
| 7,484,330 | B2 * | 2/2009 | Lougheed | A01G 13/0262 47/9 |
| 8,256,160 | B2 * | 9/2012 | Rubin | B01J 20/16 47/58.1 SC |
| 8,936,673 | B2 * | 1/2015 | Fischer | B09B 1/004 106/900 |
| 2005/0246949 | A1 * | 11/2005 | Girard | C09K 17/52 47/9 |
| 2008/0035217 | A1 * | 2/2008 | Hartman | B01F 33/821 366/132 |
| 2011/0024514 | A1 * | 2/2011 | Breen | A01G 13/0262 252/88.1 |
| 2017/0015601 | A1 * | 1/2017 | Wilson | C05G 5/12 |
| 2017/0318754 | A1 * | 11/2017 | Hartman | A01G 24/20 |

* cited by examiner

METHOD AND APPARATUS FOR MIXING GROW MEDIA AND ADDMIXTURES WITH A POLYMER FOR SPRAYING ONTO SURFACES FOR THE GROWING OF PLANTS AND THE MANAGEMENT OF WATER

CROSS-REFERENCE TO RELATED DOCUMENTS

This application is related to U.S. provisional application 62/465,813 is included herein in its entirety by reference and physical copy.

BACKGROUND OF THE INVENTION

1. Field of the Invention

The present invention is in the field of green roofs, living roofs or other surfaces on which it is desirous to grow vegetation. The invention also handles water management and erosion control through the absorption and holding of water via a special mixture of a soil like media and a proprietary polymer (The mixture of soil like media and a polymer will hereafter be called a Matrix or the Matrix). The present invention is also in the field of growing produce, grasses, flowers and any other plant capable of growth. The invention is in the field of germinating and growing flora and fauna on any surface by the application of a mixture of a polymer, a soil like mix and hot water we will use a roof or other surface as one preferred embodiment but this embodiment is not indented to limit the invention as it has many other uses

2. Discussion of the State of the Art

According to Wikipedia a green roof or living roof (or other surface) is a roof or other surface of a building that is partially or completely covered with vegetation and a growing medium, planted over a waterproof or other membrane can be seen in FIG. 9 involving multiple layers. These multiple layers include bit are not limited to a Vegetation layer 915. A growing medium layer 916, a filter layer 917, a drainage storage layer 918, an insulation layer 919, a waterproof membrane layer 920, a protection board 921 and the roof deck 922. All of these layers have a serious weight limitation as the structures themselves must hold the weight of the growing media and the various layers of material in the green roof system or other surface system. Container gardens on roof or other surfaces, where plants are maintained in pots, are not generally considered true green roof or other surfaces, although this is debated. Roof or other surface top ponds are another form of green roof or other surfaces which are used to treat grey water.

Green roof or other surfaces and surfaces serve several purposes for a building or landscape, such as absorbing rainwater, providing insulation, creating a habitat for wildlife, increasing benevolence and decreasing stress of the people around the roof or other surface or other surface by providing a more aesthetically pleasing landscape, and helping to lower urban air temperatures and mitigate the heat island effect. They effectively utilize the natural functions of plants and their associated bacteria to filter water and treat air in urban and suburban landscapes. There are two types of green roof or other surface: intensive roof or other surfaces, which are thicker, with a minimum depth of 12.8 cm (5.0 in), and can support a wider variety of plants but are heavier and require more maintenance, and extensive roof or other surfaces, which are shallow, ranging in depth from 2 cm (0.79 in) to 12.7 cm (5.0 in), lighter than intensive green roof or other surfaces, and require minimal maintenance.

The term green roof or other surface may also be used to indicate roof or other surfaces that use some form of green technology, such as a cool roof or other surface, a roof or other surface with solar thermal collectors or photovoltaic panels. Green roof or other surfaces are also referred to as eco-roof or other surfaces, oikosteges, vegetated roof or other surfaces, living roof or other surfaces, greenroofs or other surfaces and VCP (Horizontal Vegetated Complex Partitions).

There are several problems with the installation and maintenance of green roof or other surfaces on the market today. The installation means lack the ability to properly cover a roof or other surface with a growing media at an even thickness and that is economically viable and light weight. Roof or other surfaces on commercial and residential buildings have many vents, air conditioners, sky lights and obstructions that make installation of a green roof or other surface difficult. The current installation methods lack the ability to cover the entire roof or other surface. The weight of a green roof or other surface growing system is of particular concern also. Most green roof or other surface systems are simply too heavy. The various layers of a green roof or other surface system can have up to 13 different layers. Adding the weight of 13 layers with the growing media and water retention can render the system to heavy for a lot of structures.

What is clearly needed is a method of green roof or other surface or green surface installation that can alleviate all of the current problems associated with current green roof or other surface systems or other green enhanced structures system installations. The inventor has invented a green roof or other surface and green surface installation method and system that has overcome many of the problems stated relating to a green roof or other surface installation system or a green surface installation system that others thought impossible. The inventor has formulated a perfect blend of soil like growing ingredients mixed with his proprietary polymer. The soil like mixture can contain but is not limited to bark, peat moss, Finland Peat moss, worm castings, coconut fiber, natural organic latex, perlite, vermiculite, deactivated charcoal, biochar, specially processed biochar, silica sand or amorphous silica, and an aggregate rock of any size. Hereafter in this patent specification this mixture will refer to as "a Matrix or the Matrix".

BRIEF SUMMARY OF THE INVENTION

Insert after claims are drafted

DETAILED DESCRIPTION OF THE INVENTION

The present invention involves mixing a polymer with various growing media and or mediums. The media is a mixture of specialized growing materials, other proprietary materials and substances and some mild fertilizers which will be named later in this specification. The inventor has solved the problem of how to get these tons of dry materials up and onto the top of a roof or other surface and mix them with a special bio-friendly polymer such that they can be laid down in an even layer thereby creating a growing roof or other surface in the most economically friendly way possible. There are many embodiments of the invention. The illustration of this particular embodiment does not limit this invention to other embodiments of the invention described herein or not.

Figure 1:
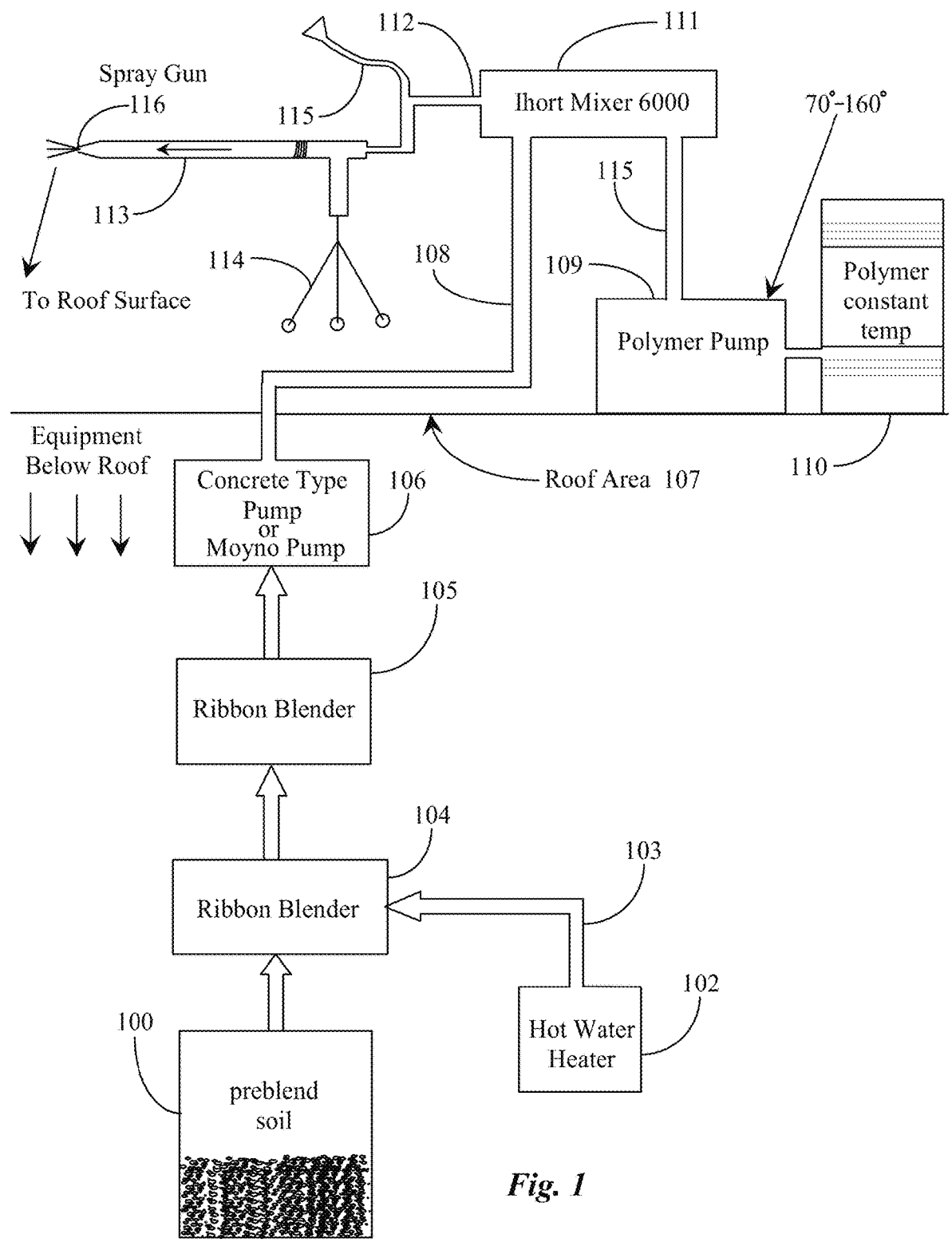
FIG. 1 is a block diagram showing the process by which the invention is implemented in one embodiment of the present invention.

FIG. 1 is a block diagram showing the process by which the invention, in one embodiment, is accomplished. The system consists of a:

Dry materials tank or hopper element 100 for pre-blended matrix ingredients.

a hot water heater element 102.

a conduit 103 for communication hot water.

An Ackerson type of metering apparatus 104 for dry goods. The type of mixer is immaterial. It's basically an apparatus that can meter dry goods very accurately Element 105 is an IHORT Mixer 5000 (which stands for International Horticultural Technologies, Inc.) The blending pump can be any pump capable of blending and pumping material a concrete type pump or a moyno type pump 106

Roof or other surface delineation point 107. Those items on the upper side are considered on the roof or other surface. Items under this line are considered on the ground unless otherwise indicated.

Hose or conduit 108 carries mixture to pump 111.

Element 109 is a polymer pump which pumps constant temp polymer to mixer/pump 111.

Polymer container 110 is at a constant temperature.

IHORT Mixer 6000 is element number 111 and can be any pump capable of mixing a soil like mixture previously mixed with hot water through conduit 108 and then mixing a polymer from conduit 102 and then pumping that mixture to an application apparatus.

Element 112 is a hose or conduit connecting 111 with application apparatus 113.

113 Is the application apparatus or gun.

Element 114 is a tripod for gun or application apparatus to rest according to one preferred embodiment of the invention.

115 is the nozzle of the gun/application apparatus

Nozzle 115 controls the direction and thickness of the matrix emitted from gun 113.

Elements referred to as conduits, pipes or hoses that communicate various mixtures according to one embodiment of the invention are numbered as element numbers 103, 116, 117, 118, 108, 120, 119, 112 and 113.

FIG. 1 is a view of the process of dispensing the matrix onto a roof or other surface. In this embodiment the word roof or other surface is used however any other surface may be represented here. When the inventor refers to the word roof or other surface he is also referring to any other surface that intended to be grown on. Element 100 contains all of the dry ingredients that will make up the matrix according to one embodiment of the present invention. The pre-blended dry ingredients are in a hopper above ribbon mixer 104. Hot water and pre-mixed liquid additives are heated in hot water heater 102 and added to blender 104 via conduit 103 along with the pre-mixed dry ingredients.

In mixer 104 the pre-mixed dry and the premixed liquid ingredients are mixed into a slurry. The mixed slurry is conveyed to a second ribbon blender 105 via conduit 117 to continue the mixing process to form a semi liquid matrix suitable for pumping. The slurry is pumped via conduit 118 to a concrete type pump 106. It should be noted here that any other type of pump capable of pumping the slurry up and onto a roof or other surface or other surface may also be used. It should also be noted here that any of the pumps or equipment may be substituted for other equipment that may serve the same purpose. The invention is not limited by the type of equipment in the drawings or text.

The slurry is then pumped from pump 106 via conduit 108 up and onto the roof or other surface 107 and into element 111 IHORT mixer 6000. Element 111, IHORT mixer 6000, is any pump capable of pumping the slurry. The polymer container element 110 holds polymer which may be heated to a constant temperature near 120 for this embodiment. The polymer container element 110 may be a 55 gallon drum or any other type of container suitable for the operation at hand. Elements 110, 109, 111, 112, 108, 114, 113, 115 and 120 may be contained in a mobile vehicle for transport and application across larger areas. This vehicle could be an ATV like vehicle with a bed suitable for containing the elements of the operation for mixture and application of the matrix. Polymer 110 is fed into polymer pump 109 where it is pumped via conduit 120 into the IHORT mixer 6000 element 111. From pump 111 the mixture of slurry and polymer are pumped via conduit 112 into gun/application apparatus 113. Gun 113 may be any type of apparatus that is suitable for spraying or the dispensing of the final matrix. Application apparatus 113 may be set on tripod 114 for stability. Nozzle 115 at one end of spray gun/application apparatus 113 may take on different shapes depending on the desired thickness of the final matrix layer on the roof or other surface. The matrix may also be laid down in layers if desired. The final matrix may also be dispensed through a simple hose of the concrete variety. Other methods of final delivery of the matrix onto the roof or other surface or other surface will be discussed in later paragraphs of the instant specification.

Figure 2:
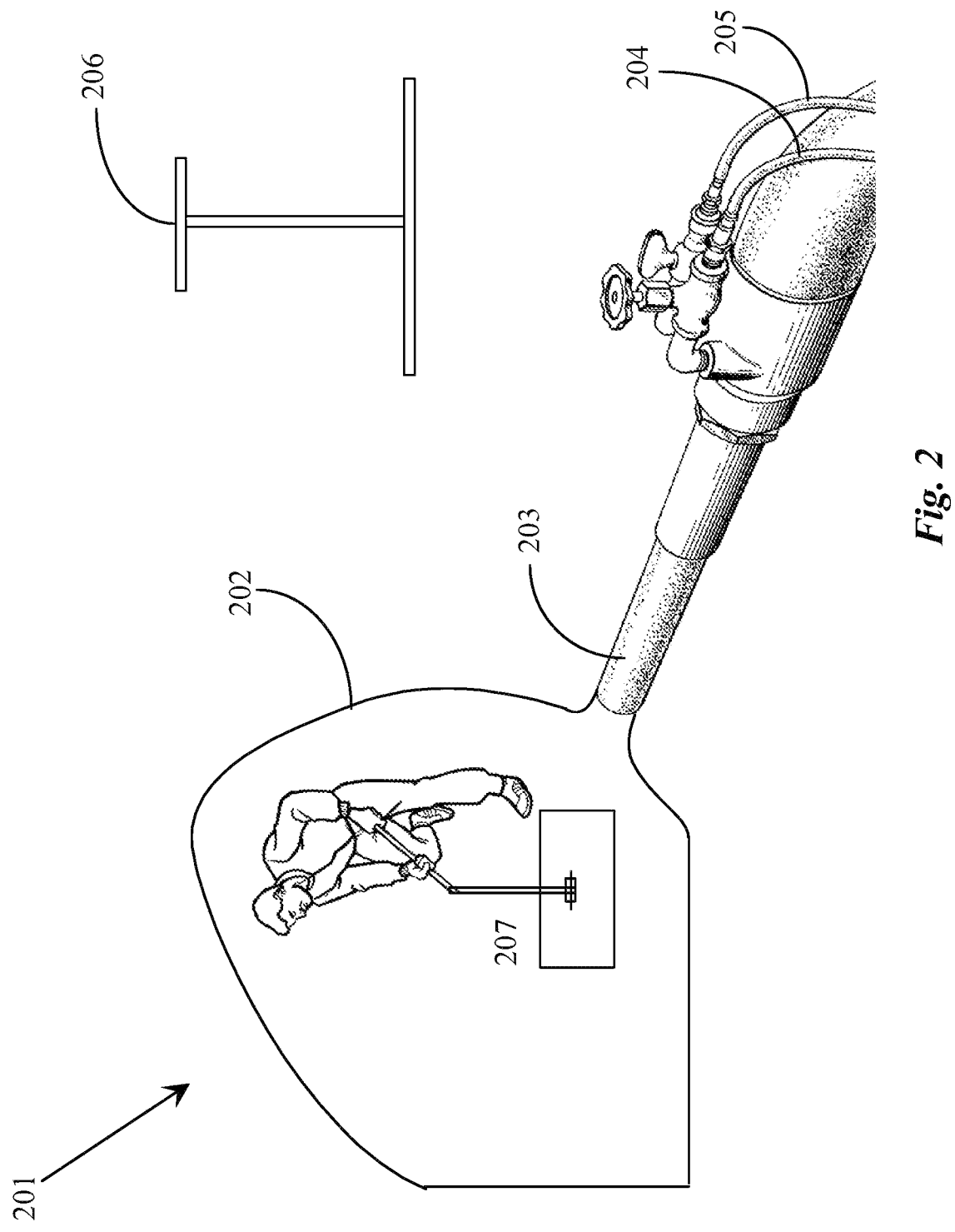
FIG. 2 is a diagram of the gun used to spray the matrix mixture according to one embodiment of the present invention.

FIG. 2 is an illustration of an installation person 202 flattening the matrix 208 (if needed) during polymerization to insure a flat layer on the roof or other surface. Typically the application apparatus of FIG. 1 will leave a flat enough surface for our purposes however if further flattening is desired element 206 can be used. The matrix 208 is dispensed 210 through apparatus 203 onto the roof or other surface. Matrix 208 may be mixed with polymer prior to arrival at the application apparatus 203. Matrix 208 may also be mixed in apparatus 203 in section 211 of the application apparatus 203. Mixture of hot water, polymer and premixed soil like media may be delivered through hose 204 while preheated polymer may arrive via hose 205. Mixing would then occur in section 211 (internal mixing elements not shown) of application apparatus 203 and then dispensed as matrix spray 210. Once the polymerization begins the installation person may flatten the matrix according to the desired thickness. The matrix 208 can be seen before flattening in FIG. 2. The flattened matrix 209 may be seen right below and in front of the flattening apparatus 206. Element 206 is a flattening apparatus and may have a design or pattern embossed thereon enabling the installation person to impart a pattern or design onto the surface of the final matrix.

Element 204 and 205 are hoses or conduits that may serve different purposes. In one embodiment of the invention high pressure air is injected into the matrix/polymer stream thereby achieving a splattering effect as the matrix is dispensed. As the application apparatus 203 splatters the matrix onto the roof or other the matrix is still polymerizing. As the splattered bits of matrix hit the roof or other surface or other surface they join and flow to some degree with other splattered bits of matrix forming a uniform layer of matrix. Matrix is glue like and sticks to every surface until polymerization is complete.

Figure 3:
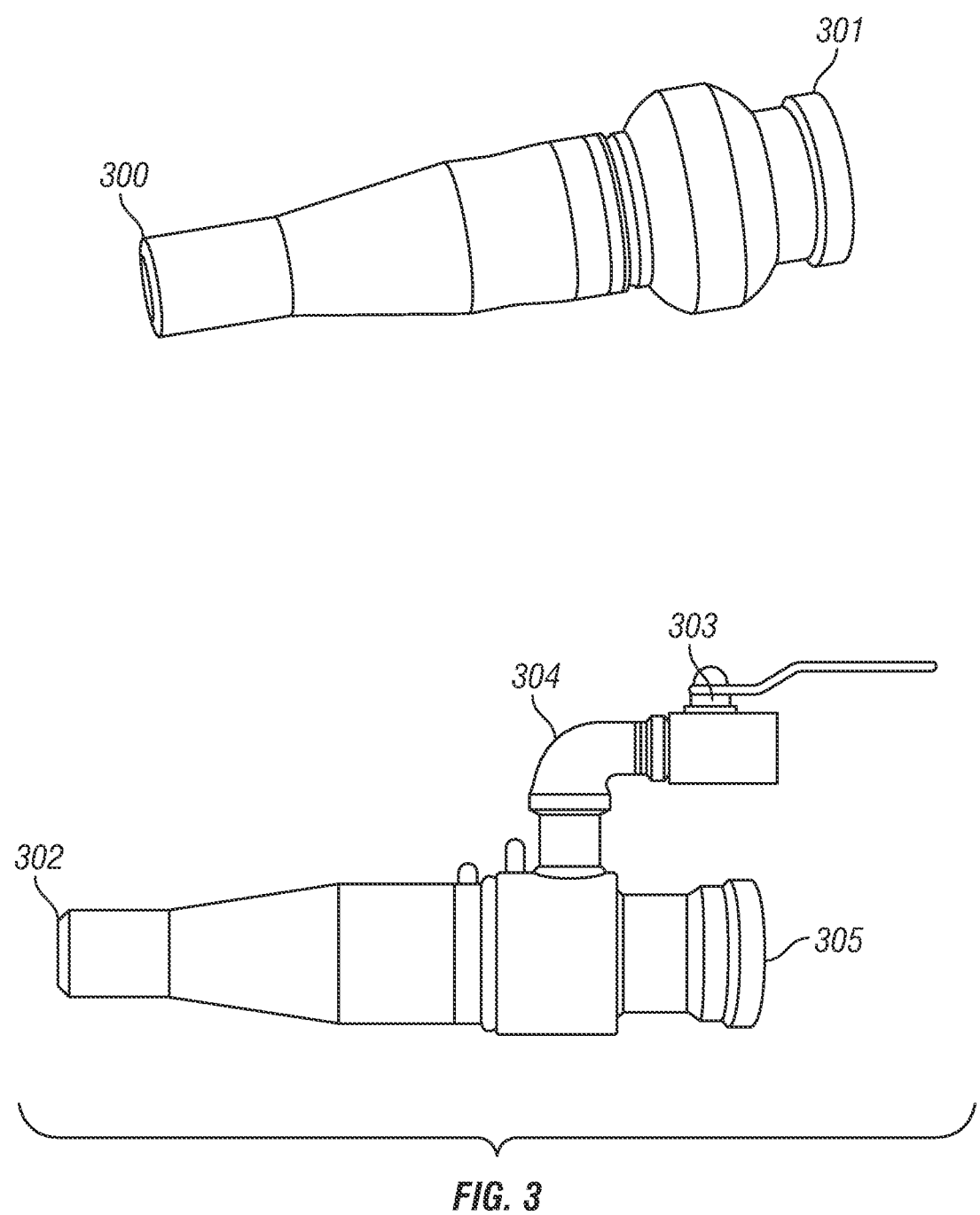
FIG. 3 contains images of possible nozzles used to spray matrix according to one embodiment of the present invention.

FIG. 3 is an illustration of another embodiment of a matrix dispensing apparatus for the delivery of the matrix onto a roof or other surface 201 of Fig. 2 Element 300 is a rubberized nozzle attached to metal coupler 301 which will connect to a standard concrete pump type hose. In another embodiment the inventor has designed special plastic disposable couplers 301 and disposable hoses or conduits that connect in a manner similar to concrete hose connections. The idea is to use the disposable couplers and hoses to dispense the matrix onto a roof or other surface or other surface without having to clean out couplings and hoses during or after the dispensing of the matrix. This makes the process more economical and faster. Matrix application apparatus 302 is similar to 300 except that element 302 has the ability of mixing the slurry of soil like growing media, hot water with hot polymer right at the pipe 304. The slurry of soil like growing media, hot water may arrive via a hose (not shown) which attached to coupler 305. The hot polymer may arrive at valve 303 mixing with slurry and out at 302.

Figure 4:
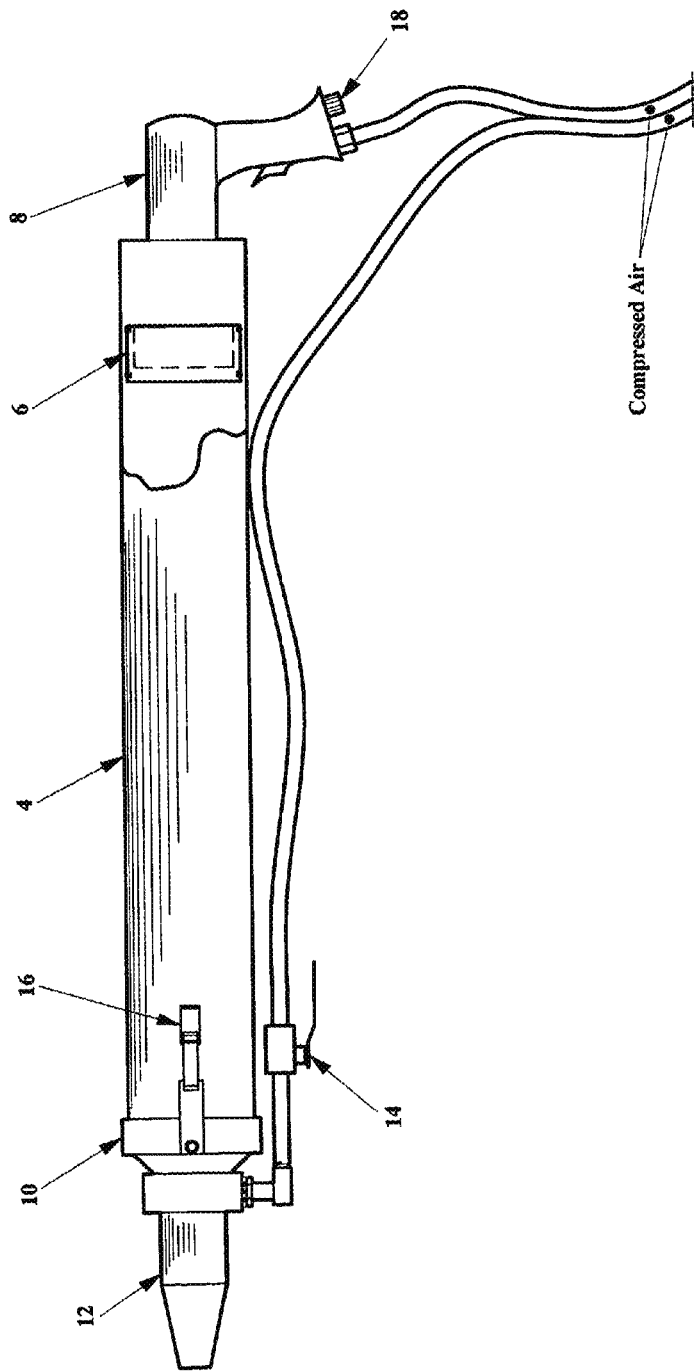
FIG. 4 is side view of a possible gun used to apply the matrix according to one embodiment of the present invention.

FIG. 4 is also an illustration of a possible form factor of a gun/application apparatus 400 to dispense the matrix onto a roof or other surface according to one embodiment of the invention. Gun/apparatus 400 is unique in its ability to spray or spatter a matrix of the density and fluidity of the matrix of the present invention. In one embodiment element 409 is a compressed air conduit. Element 410 is a conduit feeding the matrix under pressure in its final form (mixed with polymer) before being exposed to the atmosphere. The matrix is fed into the gun 404. Matrix fills cylinder 411 in gun 404. Once the cylinder is full the handles 406 and 403 are opened. Handle 403 opens the cylinder full of matrix and handle 406 opens the compressed air. In one embodiment the matrix fills nozzle 402 to the end and then trigger 408 is pulled which blasts a volume of air out of nozzle 402 through conduit 407, carrying the volume of matrix filled into nozzle 402 with it. Once the trigger is pulled, the matrix (under pressure), fills nozzle 402 again and the process is repeated thereby creating a spray of matrix. Once the matrix hits the roof or other surface or other surface it will coalesce with the matrix previously sprayed and the matrix being sprayed currently thereby creating a method of creating a layer of matrix on a roof or other surface or other surface. This method or the straight hose method of dispensing the matrix of the present invention will cover and flow around any vents, skylights, air conditioners or any other obstructions there might be on the roof or other surface or other surface to be covered with the matrix.

Figure 5A:
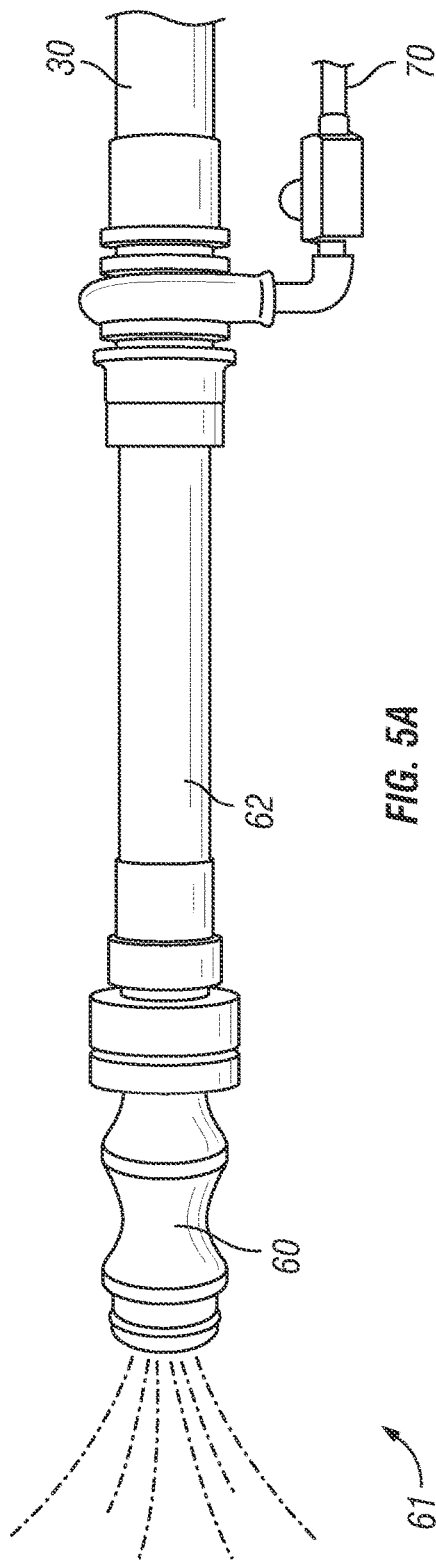
FIGS. 5A and 5B are side views of a possible gun used to apply the matrix according to one embodiment of the present invention.
Figure 5B:
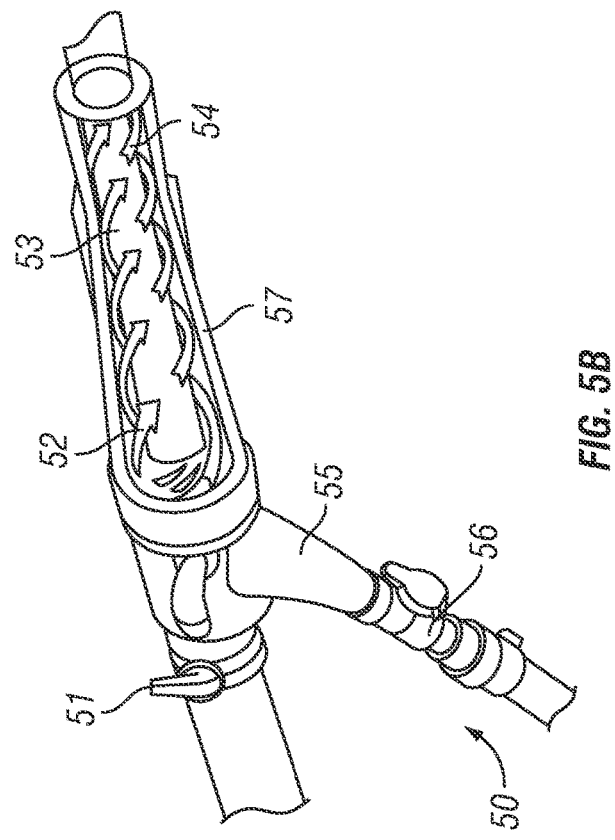
Figure 6:
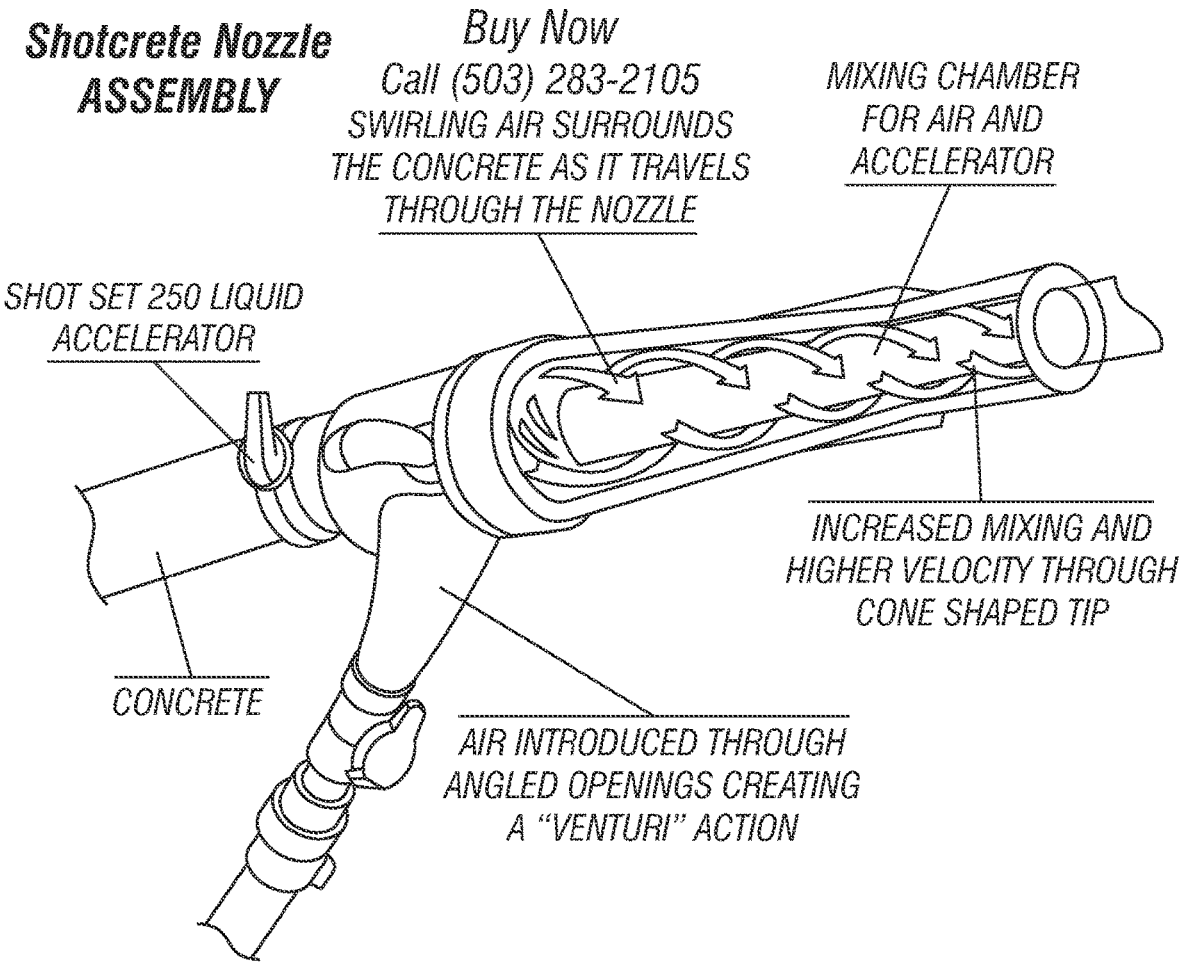
FIG. 6 is a perspective view of a possible application process according to one embodiment of the present invention.
Figure 7:
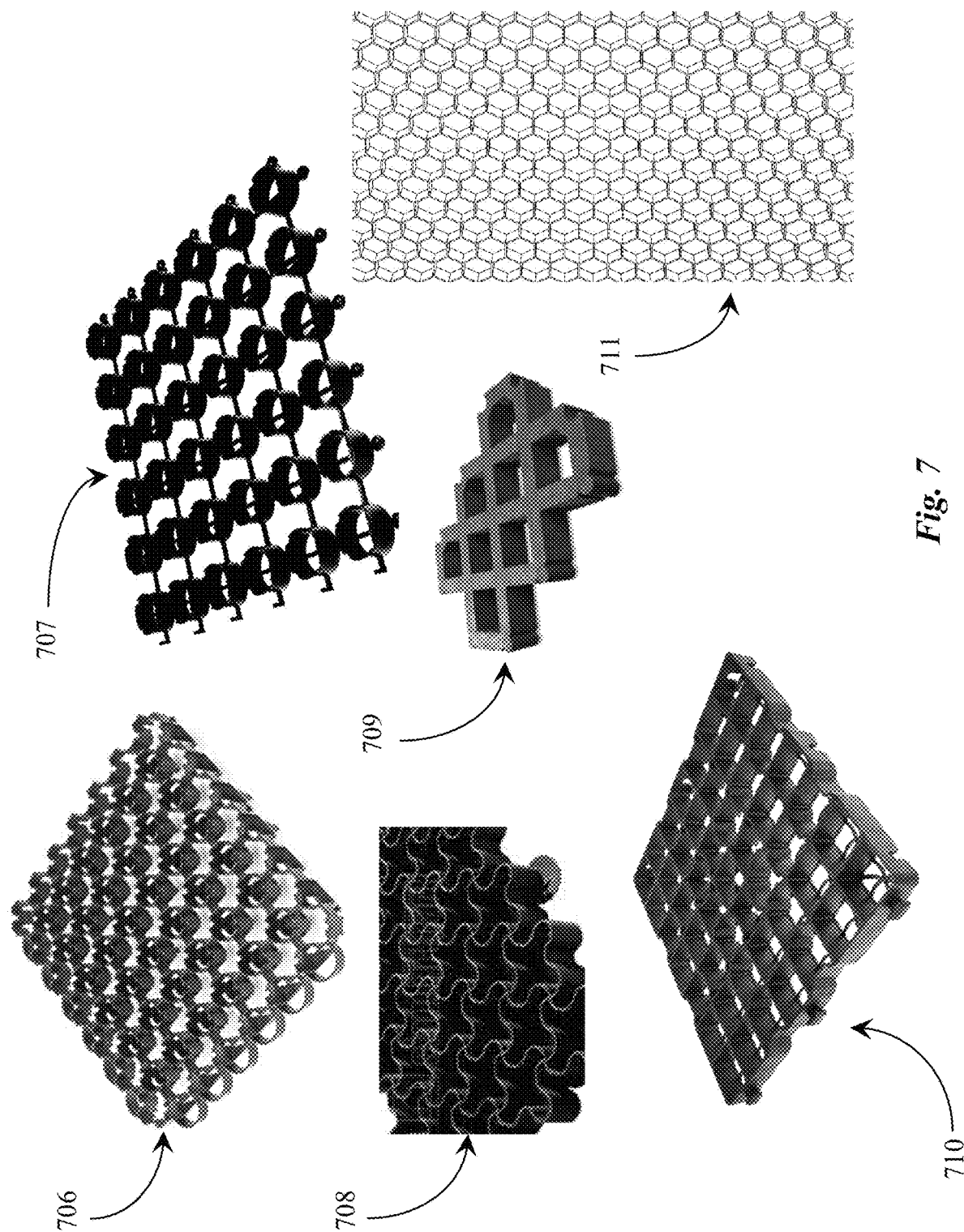
FIG. 7 is a perspective view of several examples of grids to be filled with a matrix according to one embodiment of the present invention.

FIGS. 5A-5B are examples of of a dispensing gun/nozzle according to one embodiment of the present invention. Gun 61 has a special chamber 62 wherein a tornado of air 52 aids in the dispensation of the matrix. Gun 50 is an example of the airflow taking place in chamber 62 of gun 61. In this embodiment the matrix slurry mixed with the polymer are pumped into the gun at pressure through conduit 30. Air is also pumped into gun 61 at conduit 70. Due to certain physical features on the interior of chamber 62 the high pressure air pumped in at conduit 70 takes on a swirling effect on the outside of the interior of chamber 62 such that the matrix is floated in the center of this swirling air column. The effect of the air swirling around the matrix inside chamber 62 reduces the friction of passage of the matrix. This increases the speed at which the matrix is leaving the nozzle 60 creating a spray at the end on nozzle 60.

Gun 50 shows what the action would be inside chamber 62 of gun 61. The matrix/polymer is introduced at conduit 56 and into the gun via conduit 55. Air comes in through valve 51. The air takes on its swirling effect like a tornado (shown in elements 52, 53 and 54) along the outside of the interior of chamber 57 of gun 50. This as stated above reduces the friction and increases the speed of the matrix such that it forms a spray as it comes out of nozzle 60. Once the matrix is sprayed out and is exposed to other matrix previously sprayed, the matrix sprayed before and after coalesces into one continuous layer of matrix of a suitable and predictable thickness that is suitable for growing all sorts of plants.

FIG. 6 shows the application process 61 according to one embodiment of the present invention. Nozzelman 62 is applying in a spray 67 which are the growing ingredients that have previously been mixed with the polymer through hose 63 and nozzle 66. Nozzelman 62 is laying down a layer of matrix 65 on a flat surface and on a vertical surface. The polymer that is mixed with the growing ingredients is a very sticky formula designed to adhere to vertical surfaces. In some embodiments a plastic grid 64 may be used on vertical or horizontal surfaces to lend rigidity to the final layer of matrix being applied. As referred to in this specification carbon fiber or fiberglass or any other strengthening fibers may also be added to lend rigidity to the final layer of matrix laid down upon the roof or other surface or other surface. Element 64 may also be any type of grid as can be seen in FIG. 7. These grids may be laid down and attached on horizontal and vertical and any slant in between. Any of the spraying apparatus or application apparatus in this specification may be used to fill these grids.

FIG. 7 is a perspective view of several examples of grids to be filled with a matrix according to one embodiment of the present invention. Grid 708 or 709 would be a good grid for use in a heavy traffic area that a user would still want to have grass. Grid 706 is an example that would be suitable for a roof or a wall. Grid 706 will bend around curvatures as well so that the matrix may be sprayed into this grid along a curved surface for artistic purposes or other purposes. Grid 707 is another example of a tile like grid that would bend around surfaces or be used on the ground for erosion control such as being laid down on a unstable hillside then sprayed with our proprietary matrix and then planed with a deep rooted plants to keep the hillside stable. Grid 708 is also a heavy duty interlocking grid that can be used for laying down and then being filled with our matrix and used for growing. Grid 711 would be a preferred grid, in one embodiment, to use as a surface to fill with our matrix and to be cut in squares or rectangles to be used in ones house for a pet to urinate or defecate on and light enough to take outside and clean of hose off. In one embodiment catnip is mixed in with the admixtures while mixing the polymer with growing ingredients. This makes this portable grass mat your cat's favorite place to pee. Grid is similar to a grid used to lay out on a driveway or such to take heavy traffic. The process goes like this. The surface is prepared to ones liking depending on the weight of the traffic. A user may use gravel or base rock underneath and then lay a grid like tile down to be filled with the matrix. The grid may be interlocking tiles or rolled out from a roll of grid like material. The user may also choose to lay the matrix directly on the surface to be grown.

Figure 8:
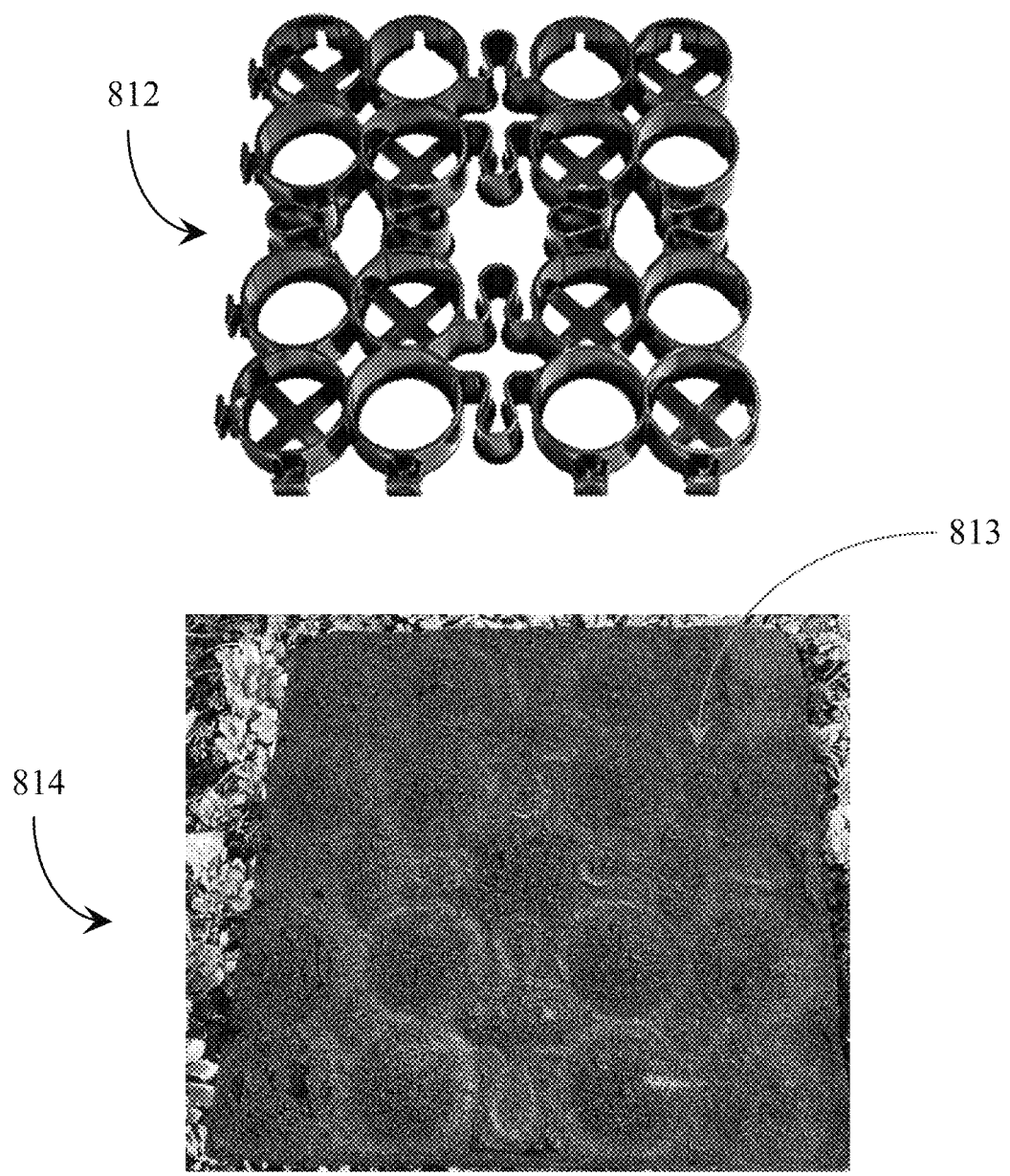
FIG. 8 is a perspective view a grid filled with a matrix according to one embodiment of the present invention.

FIG. 8 is a perspective view a grid 812 filled with a matrix 814 according to one embodiment of the present invention. One can see the outline of the grid underneath the matrix. The covering of the top of the grid with a depth of matrix 813 is important as grass or other flora or fauna will be grown on and in this grid and it is preferable that the actual structure not be seen unless intended to be so. Grid 812 is the perfect grid for driveways, parking lots and football arenas and areas where heavy traffic will be frequent.

Figure 9:
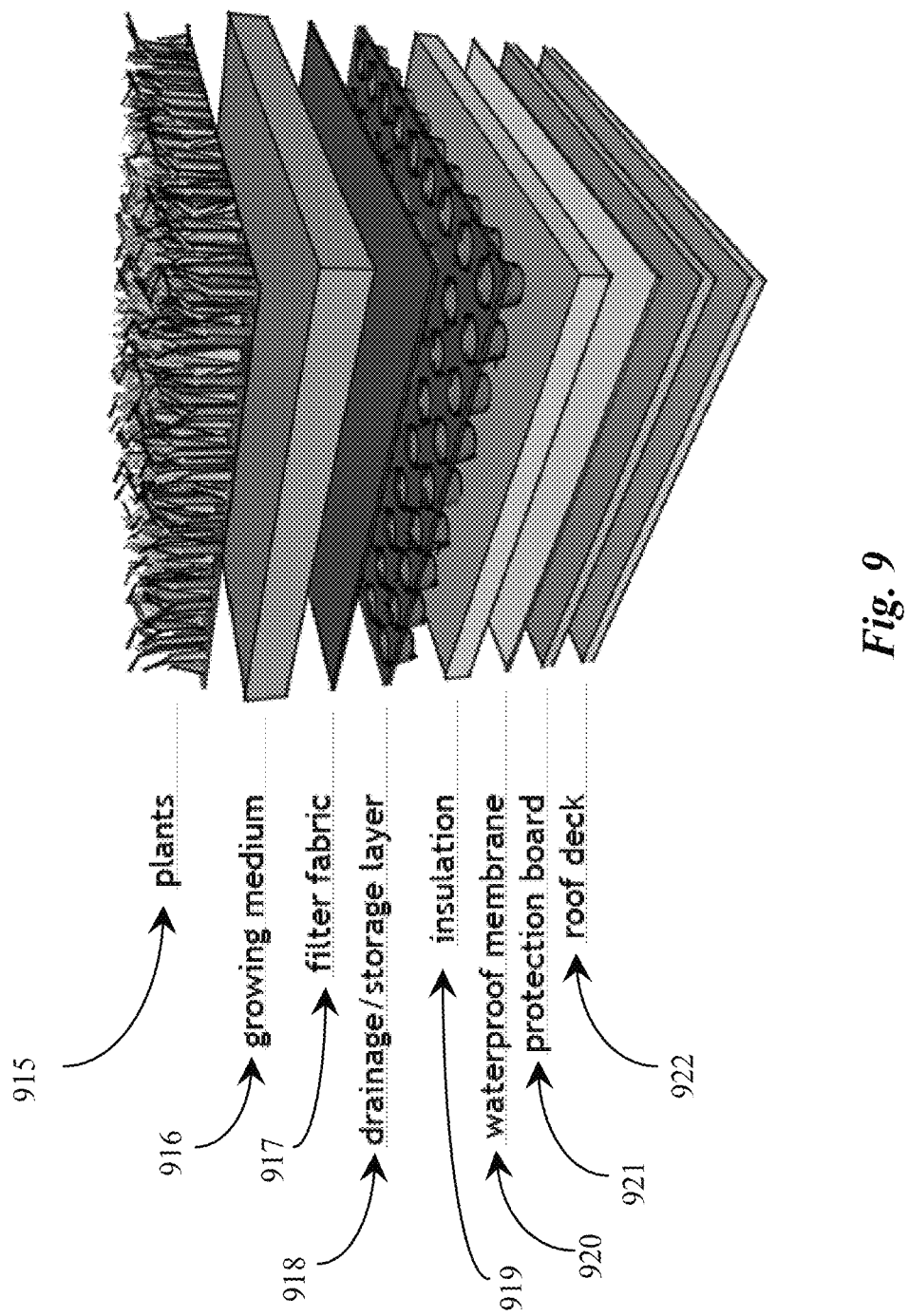
FIG. 9 is a perspective view of the typical layers of a living roof according to the prior art.

FIG. 9 is a perspective view of the typical layers of a living roof according to the prior art. FIG. 9 involves multiple layers to a green roof. These multiple layers include but are not limited to a Vegetation layer 915. A growing medium layer 916, a filter layer 917, a drainage storage layer 918, an insulation layer 919, a waterproof membrane layer 920, a protection board 921 and the roof deck 922. This example is of a minimal number of layers. Other systems in the prior art have as many as 13 layers to 15 layers and some more than that. The weight of all of these layers along with the weight of the vegetation growing medium, which most manufacturers use actual dirt and rocks, is considerable as said before and can lead to structure failure or at the very least limit the type of structures these types of systems can be used on. The inventor has invented a system and matrix that will hold more water for longer saving on water costs. The weight for example, polyurethane prepolymers comprising a polyol and an isocyanate (e.g., diisocyanates) may be used in a polymer matrix. The resulting polymers form foams and hydrogels that can comprise many times their dry weight in water (e.g., up to 90% water).

Figure 10:
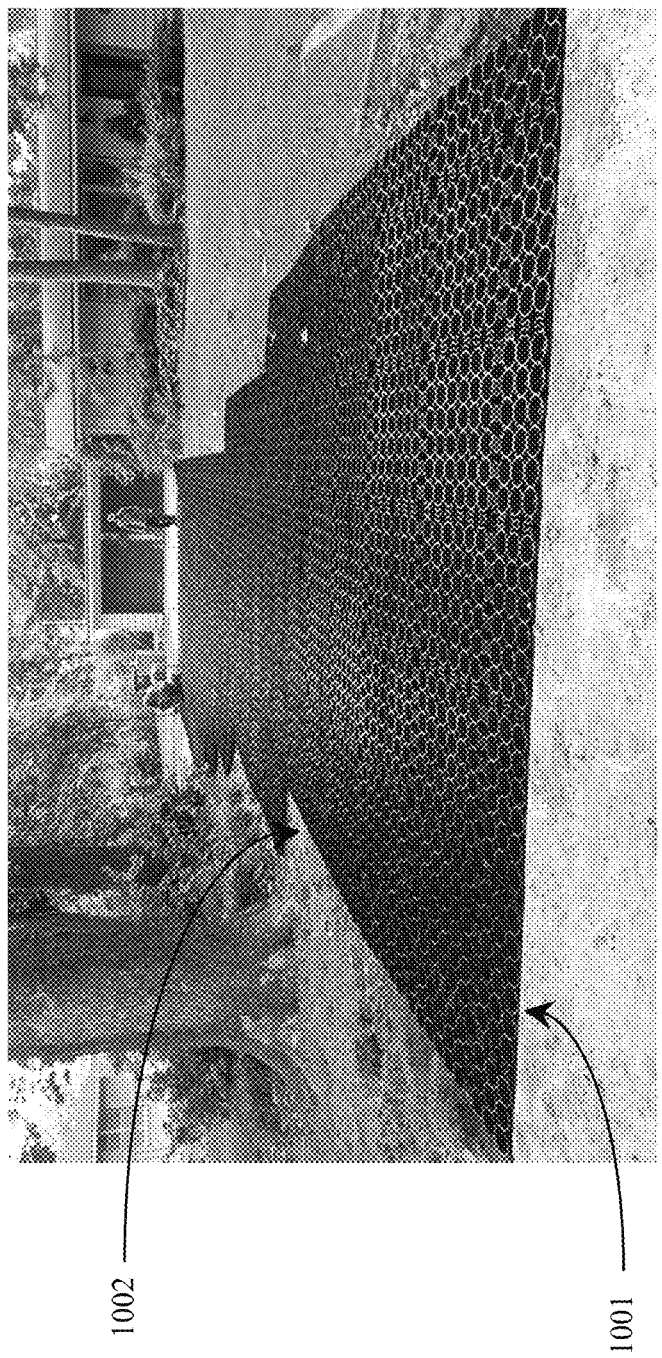
FIG. 10 is an illustration of a driveway with grids installed (prior to filling with matrix) according to one embodiment of the invention
Figure 11:
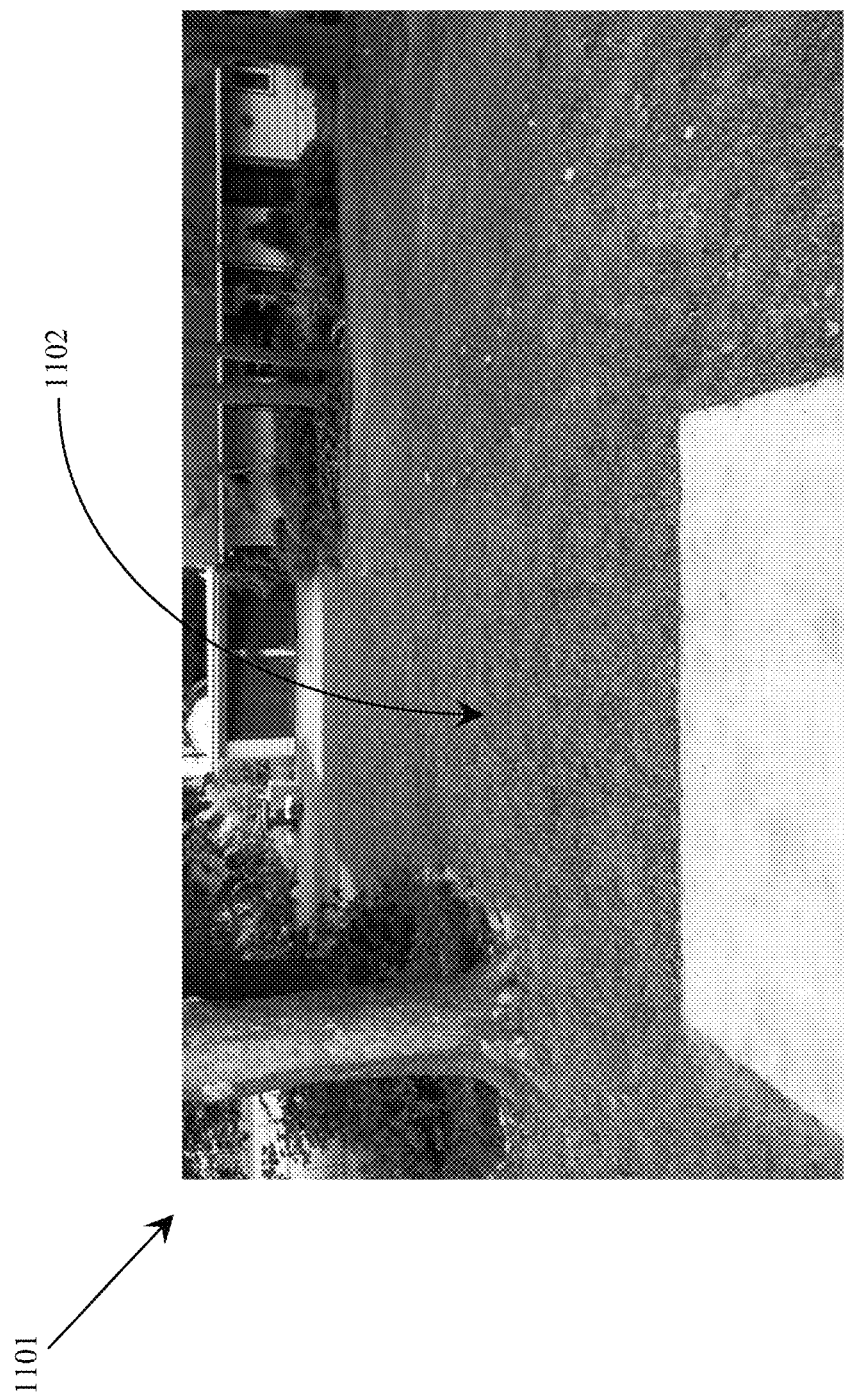
FIG. 11 is an illustration of a driveway with grids installed filled with a special matrix according to one embodiment of the invention

FIG. 10 is an example of a driveway that the owner decided to expand into part of the existing yard so their kids could have a bigger yard. In this embodiment interlocking tiles 102 are snapped together and laid out where the concrete driveways use to be. The concrete 1001 has been removed for this purpose. The owner then hires the company that applies the matrix using the same method as seen in FIG. 1 except this is not a roof and the process goes much more smoothly on the ground. The owner orders a custom mix of matrix for their particular purpose such as what seed is pre-infused, what level of give they would like, how hard they would like the matrix. Remember that any of the parameters discussed in this specification may be adjusted at will to make a customized matrix for a plethora of uses and can be adjusted within the process. Grids or tiles are rolled or laid out and the matrix is infused into the grids 1002 using one of the same methods as discussed previously in this specification. Once watered the matrix will germinate the seeds and grow the grass seen in FIG. 11. One can see the line of new and old grass on the right of the drawing. The new grass being element 1102. The owner may just want matrix with no grid so that it is softer and the traffic is light. This matrix has memory foam properties and will return to its original shape once weight is removed. The owner may now drive on the new grass driveway park on it or anything else. This driveway will be cheaper than concrete, more environmental friendly. Even when it is raining and the rest of the yard is soaked the driveway will still hold traffic and not sink due to the rigidity of the tile like structure underneath.

Any Soil or Soil Like Mixtures Mixed with a Polymer and Hot Water and Additives are Referred to Herein as "the Matrix"

In this invention we will be referring to a Matrix, a growing media or medium, dry growing ingredients and a polymer and a liquid or liquids such as hot water or other liquid additives such as fertilizer, minerals and or micronutrients. Once the growing media and other ingredients liquid or dry are mixed with a polymer we will be referring to the mixture as a matrix. In one embodiment a special hydrophilic polymer (discussed in more enabling detail later in the specification) mixed with growing ingredients and admixtures are herein after referred to as a matrix. In certain aspects sponge-like matrix materials are provided which are porous, retain water and can be used to maintain plant growth. Matrix materials, for instance, can comprise an admixture of a hydrophilic polymer, such as polyurethane, and one or more of the following materials. The below materials are exemplary of soil or soil like mixtures;

Bark, peat moss, biochar, worm castings, coconut fiber, natural organic latex, perlite, biochar, vermiculite, deactivated charcoal, silica, amorphous silica or any other ingredient that promotes growth. An aggregate of any size according to particular applications can and does grow plants as well. In fact this special polymer mixed with just plain rock will also hold and retain water quite well according to experiments conducted by the inventor.

In one embodiment a roof or other surface is covered with a matrix composed of a hydrophilic or other polymer having sponge-like characteristics that is porous, retains water and can be used to maintain plant growth, For example, one or more soil like components can be mixed with polymer subunits prior to polymerization to provide a sponge-like matrix. Additional components and admixtures can be incorporated into a matrix according to the embodiments (either before, during or after the polymer subunits have been polymerized). A matrix according to the invention is substantially porous thereby maintain substantial water and air content within the matrix. For example, a matrix can comprise an average porosity of between about 10 and 300 pores per inch or any other number pores per inch according to the application. A matrix can also be designed to be below or above those porosity numbers mentioned above of between about 10 and 300 pores per inch In certain aspects, a sponge-like matrix according to the embodiments is mechanically resilient and can return to its original shape following mechanical compression (e.g., the matrix can be defined as memory foam). In still further aspects, a sponge-like matrix is substantially non-friable. For example, a matrix according to the embodiments can, in some aspects, be cut without a significant portion of the matrix crumbling-away. The memory foam aspect is very important when creating a surface where heavy traffic will take place. Non-friability will insure little loss of matrix over time in a high traffic embodiment.

In one embodiment, the matrix comprises a polyurethane polymer, such as a polymer of a polyol and an isocyanate (e.g., a diisocyanate). These subunits once polymerized form a cross-linked web of polar polymer strands that can maintain water content. In certain aspects, the matrix can be defined by the size of the molecules between the cross linking bonds. For example, in certain aspects, the polymer can be defined by the equivalent weight per NCO, such as a polymer comprising an equivalent weight of between about 100 and 1,000 per NCO (e.g., about 300, 400 or 500 to about 700).

As detailed herein, in certain aspects, isocyanates form part of a hydrophilic polymer matrix according to the invention. The isocyanate can be, without limitation, methylene diphenyl diisocyanate (MDI), toluene diisocyanate (TDI), hexamethylene diisocyanate (HDI) and/or isophorone diisocyanate (IPDI). For example, a MDI polymer may be formed from 2,2'-MDI, 2,4'-MDI, 4,4'-MDI or a mixture thereof. Monomeric or polymeric MDI can, for example, be reacted with polyols to form MDI-based polyurethanes. Likewise, in certain aspects, the polymer is a TDI-based polymer, such a polymer formed by 2,4-TDI, 2,6-TDI or a mixture thereof. For instance, the polymer may be formed from a mixture of a 2,4-TDI and 2,6-TDI at a ratio of about 80:20, 70:30, 60:40 or 65:35.

In further aspects, a hydrophilic polymer is formed from polyol component molecules, such as polymeric polyols (e.g., a polyether or polyester). Thus, in certain aspects a hydrophilic matrix comprises a polyether and/or polyester linkages. The polyol component can, in certain aspects, be characterized by a molecular weight (MW) of between about 250 and 10,000 (e.g., about 1,000, 1,500, 2,000, 2,500, 3,000, 3,500, 4,000, 4,500, 5,000, 6,000, 7,000, 8,000 or 149,000).

In certain embodiments, a sponge-like matrix comprises one or more amorphous silica component(s) mixed into a grow like media referred to above. In some aspects, the amorphous silica is dispersed homogeneously throughout the polymer matrix. The amorphous silica component can, for example, be vermiculite, biotite, phlogopite, mica, perlite, hydrated obsidian, diatomaceous earth or a mixture thereof. In certain aspects, the amorphous silica is hydrated silica, such as hydrated vermiculite or perlite. In still further embodiments, expanded silicas may be used, such as expanded vermiculite and/or perlite.

As detailed herein a sponge-like matrix according to the invention may comprise additional components. For example, in certain cases, the matrix can comprise components that support plant cell survival and/or growth (e.g., fertilizers or minerals). Such components can be bark, peat moss, biochar, worm castings, coconut fiber, natural organic latex, perlite, vermiculite, deactivated charcoal, biochar, silica and an aggregate of any size.

In still further aspects, components such as surfactants can be added that facilitate or alter matrix polymerization. Examples of additional components that can be comprised in a matrix include, without limitation, a nitrogen source (e.g., an ammonium or nitrate salt), a phosphorus source, a pH adjusting agent (e.g., lime to reduce pH), a natural or synthetic fiber, a water holding/releasing agent, a surfactant, an antioxidant, a pesticide, a herbicide, an antibiotic, a plant hormone (e.g., a rooting hormone), a soil conditioning agent (e.g., clay, diatomaceous earth, crushed stone, hydrogels, or gypsum) or an anti-fungal agent.

In yet a further embodiment, a matrix according to the invention comprises plant or plant parts. For example, the matrix in one embodiment can comprise a seed, seeding, a cutting or a callus culture from a plant. A plant or plant part embedded in an impregnated tile or other surface or associated with a matrix may be a monocot (monocotyledon) or a dicot (dicotyledon). In certain aspects, the plant is a plant that can be vegetatively propagated.

In one embodiment, a thin pad of matrix is formed into a square or rectangle and comprises any type of grass grown on a thin pad to be set in a structure where pets are housed so that they may do their business on a natural grass pad that will absorb their urine/pee and such.

In another embodiment a plant or plant part of an ornamental plant (e.g., a poinsettia, impatiens or geranium), a landscaping plant, an herb, a garden vegetable or a fruit or nut tree. In one embodiment, after a roof or other surface or other surface is coated with the matrix, a roof or other surface or other surface may be enabled to receive a part, section or plug of the matrix. In further aspects, a single plant or living portion thereof is provided in each piece (e.g., section or plug) of matrix covering the roof or other surface. Thus, a plurality of plants can be provided, each in a separate plug of matrix, wherein the plurality of matrix plugs and plants can be supported on preformed openings (not shown). Preformed openings in the matrix can be made with a special plug tool after polymerization of the matrix on the roof or other surface or other surface is complete. In another embodiment a plug form may be pressed into the matrix while it is still pliable during polymerization. In another embodiment this plug form may be part of the flattening apparatus 206 of FIG. 2.

In still a further embodiment the invention provides a method for growing a plant comprising positioning a plant in a roof or other surface lined/covered with a matrix according to the embodiments and allowing the plant to grow. Thus, a plant is positioned in the matrix such that the matrix can provide water and nutrients to the plant to allow plant growth and/or survival. For example, a plant part can be positioned in a cavity in the roof or other surface covered with a matrix, such that the plant is in contact with the matrix (e.g., a portion of a plant or cutting can be embedded in the matrix).

In still further embodiments a slurry according to the invention comprises additional components either dispersed or dissolved into the slurry. For example, the slurry can comprise a nitrogen source, a phosphorous source, a surfactant, a pesticide, an herbicide, an antibiotic or an anti-fungal agent and other elements described further in this specification.

wide varieties of proprietary hydrophilic polymers are known to the inventor and can be used to form the sponge-like matrix according to the instant invention. Polymers can be formed from prepolymer subunits that are formulated de novo.

For example, polyurethane prepolymers comprising a polyol and an isocyanate (e.g., diisocyanates) may be used in a polymer matrix. The resulting polymers form foams and hydrogels that can comprise many times their dry weight in water (e.g., up to 90% water).

Surfactants

Surfactants, Surface-active materials, can, in some cases, be added to prepolymer compositions. Addition surfactants can be used to help control the size and shape of the foam cells by stabilizing the gas bubbles formed during nucleation. Surfactants can also aid in controlling the amount of cell opening and adjust shrinkage or reduced permeability.

A wide range of polymers may be used in a polymer matrix according to the invention. Suitable surfactants include anionic, cationic, dipolar-ionic (zwitterionic), ampholytic and nonionic surfactants and emulsifiers. For example, the surfactant can be block copolymers of oxyethylene and oxypropylene or a silicone glycol copolymer liquid surfactant. Silicone-polyether liquid copolymer surfactants, for example, are known to produce foams with small, fine cells. Certain of these silicone glycol copolymer liquid surfactants went into hydrophilic foam-forming compositions, the result is foams having rapid wet out. Surfactants are not, however, required for hydrophilic polymers.

Additional Components

A matrix according to the invention may comprise one or more additional components. Such components can be deposited onto a matrix after polymerization or may be added to slurry prior to or during matrix polymerization. In particular, a matrix may comprise fertilizers and/or nutrients that support plant health. Such fertilizers and/or nutrient may, for example, be dissolved in an aqueous buffer or provided as pellets that form part of a slurry during matrix formation. For example, ammonium or nitrate salts can be incorporated as a nitrogen source for plants. Likewise, a suitable phosphorus source can be included. In some aspects, the pH of the matrix environment may be adjusted by adding an acid, a base or a pH buffering agent.

In still further aspects components can be added to alter the mechanical properties of a matrix material. For example, as described above, AS can be added to the matrix. In certain other aspects, natural or synthetic fibers such as carbon fibers can be added to provide additional structure to the matrix.

Still further components can be added to maintain the health of plants embedded in the matrix including antioxidants, pesticides, herbicide (i.e., to prevent undesired plant growth in the matrix), antibiotics, plant hormone and antifungal agents. For example, if rooted plants are desired in a matrix material, plant rooting hormones may be added to the matrix. Likewise, if contamination with microorganisms is a potential problem antimicrobial or antifungal compounds can be added to the matrix. The matrix may also be infused with food grade hydrogen peroxide for control of bacteria either before polymerization or after polymerization. Hydrogen may also be produced via hydrolysis and introduced into the matrix for control of bacteria and other harmful agents. A hydrogen producing algae may also be introduced either before polymerization or after polymerization into the matrix thereby creating hydrogen naturally and naturally controlling harmful bacteria. In another embodiment hydrogenised water may be a part of the liquid additives introduced before polymerization controlling bacteria in that fashion.

For example antifungal agent for use according to the invention include tebuconazole, simeconazole, fludioxonil, fluquinconazole, difenoconazole, 4,5-dimethyl-N-(2-propenyl)-2-(trimethylsilyl)-3-thiophenecarboxamide (silthiopham), hexaconazole, etaconazole, propiconazole, triticonazole, flutriafol, epoxiconazole, fenbuconazole, bromuconazole, penconazole, imazalil, tetraconazole, flusilazole, metconazole, diniconazole, myclobutanil, triadimenol, bitertanol, pyremethanil, cyprodinil, tridemorph, fenpropimorph, kresoxim-methyl, azoxystrobin, ZEN90160, fenpiclonil, benalaxyl, furalaxyl, metalaxyl, R-metalaxyl, orfurace, oxadixyl, carboxin, prochloraz, trifulmizole, pyrifenox, acibenzolar-5-methyl, chlorothalonil, cymoaxnil, dimethomorph, famoxadone, quinoxyfen, fenpropidine, spiroxamine, triazoxide, BAS50001, hymexazole, pencycuron, fenamidone, guazatine, and cyproconazole.

Anti-microbials that may be used according to the invention include vanillin, thymol, eugenol, citral, carbacrol, biphenyl, phenyl hydroquinone, Na-o-phenylphenol, thiabendazole, K-sorbate, Na-benzoate, trihydroxybutylphenone, and propylparaben.

Plants and Plant Parts

A wide range of plants can be maintained in the growth matrix according to the invention. As used herein the term "plant" refers to plant seeds, plant cuttings, seedlings and in vitro plant cultures as well as mature plants. For example, bedding plants, flowers, ornamentals, vegetables, trees and other container stock can be provided in the substrates. Plants may be rooted in the matrix or may remain un-rooted. In certain aspects, the plants comprised in a matrix are callused.

Substrates can comprise vegetable crops or a living portions thereof such as artichokes, kohlrabi, arugula, leeks, asparagus, lentils, beans, lettuce, beets, bok choy, malanga, broccoli, melons (e.g., muskmelon, watermelon, crenshaw, honeydew, cantaloupe), brussels sprouts, cabbage, cardoni, carrots, cauliflower, okra, onions, celery, parsley, chick peas, parsnips, chicory, peas, Chinese cabbage, peppers, collards, potatoes, cucumber, pumpkins, cucurbits, radishes, dry bulb onions, rutabaga, eggplant, salsify, escarole, shallots, endive, soybean, garlic, spinach, green onions, squash, greens, sugar beets, sweet potatoes, turnip, Swiss chard, horseradish, tomatoes, kale, turnips, and a variety of herbs.

Likewise, fruit and/or vine crops can be provided such as apples, apricots, cherries, nectarines, peaches, pears, plums, prunes, quince almonds, chestnuts, filberts, pecans, pistachios, walnuts, citrus, blackberries, blueberries, boysenberries, cranberries, currants, loganberries, raspberries, strawberries, grapes, avocados, bananas, kiwi, persimmons, pomegranate, pineapple, and other tropical fruits. In short any living plant, fungus or other life form that grows naturally in soil can be grown in the matrix of the present invention.

In certain preferred aspects, ornamental plants (or living portions thereof) are provided in substrate according to the inventions. For example, a matrix can comprise a plant such as an agastache, angelonia, antirrhinum, argyrantheum, bacopa, begonia, bidens, calibrachoa, coleus, crossandra, impatiens, diascia, fuchsia, gaura, gazania, geranium, helichrysum, ipomoea, kalanchoe, lamium, lantana, lavender, lobelia, nemesia, daisy, scaevola, oxalis, petunia, hibiscus, poinsettia, salvia, torenia, verbena, or viola plant. In still further aspects, the plant can be a cactus or other succulent.

The following examples are included to demonstrate preferred embodiments of the invention. It should be appreciated by those with skill in the art that the techniques disclosed in the examples which follow represent techniques discovered by the inventor to function well in the practice of the invention, and thus can be considered to constitute preferred embodiments for its practice. However, those of skill in the art should, in light of the present disclosure, appreciate that many changes can be made in the specific embodiments which are disclosed and still obtain a like or similar result without departing from the spirit and scope of the invention.

EXAMPLE 1

Production of a Plant Growth Matrix

For formulations of plant growth substrates a slurry is initially mixed with polymer solution. A slurry of hot water and a soil like media. Nutrients (e.g., nitrogen and phosphorus sources) and other additional components such as surfactants are added to the slurry as desired. Organic growth materials may also be added at this time.

The slurry is then mixed with polyurethane pre-polymer subunits and mechanical mixing is commenced to provide a homogenous slurry solution.

Total polymer volume typically exceeds two-fold relative to the slurry volume. The resulting sponge-like polymer can be dispensed onto a roof or other surface with special proprietary equipment and processes. For example, individual plugs of polymer matrix can be arranged in pre-prepared openings in the surface of a matrix field. Optionally, the molded polymer can be further processed to the desired size of a plug or further impregnated into a like shaped receptacle in the matrix dispensed onto a roof or other surface.

Plants or plant cuttings are embedded into the polymer matrix, such that moister and nutrients maintained in the sponge-like substrate are provide to the plant material. Plants can thus be maintained in the polymer matrix over extended periods without desiccation.

What is claimed is:

1. A system for applying a growing media and polymer mixture to surfaces for the growth of all plants capable of growth comprising;
    a hopper capable of holding a pre-blended soil-like media;
    a hot water heater;
    a first ribbon blender for blending the pre-blended soil-like media with hot water from the hot water heater to form a blended growing media mixture;
    a pump capable of pumping the blending growing media mixture from the first ribbon blender;
    a reservoir of polymer maintained at a constant temperature;
    a polymer pump capable of pumping the polymer from the reservoir;
    a mixer capable of mixing the polymer and the blended growing media mixture together; and
    application apparatus capable of applying the mixed polymer and blended growing media mixture to a surface.

2. The system of claim 1 wherein the application apparatus is a spraying apparatus.

3. The system of claim 1 wherein the mixed polymer and blended growing media mixture applied to the surface absorbs and holds more water weight that than that of its own weight per square foot.

4. The system of claim 1 wherein the surface is a roof or other surface.

5. The system of claim 1 wherein the surface is a wall.

6. The system of claim 1 wherein the surface is any flat surface intended to be used to grow.

7. The system of claim 1 wherein the surface is any slanted surface intended to be used to grow.

8. The system of claim 1 wherein additives enhancing growth are added to the blended growing media mixture.

9. The system of claim 8 wherein the additives enhancing growth are a fertilizer.

10. The system of claim 1 wherein the surface may be prepared with a grid of material capable of lending rigidity to the application of the mixed polymer and blended growing media mixture.

11. The system of claim 1 wherein the mixed polymer and blended growing media mixture is flattened upon application to the surface by man or machine.

12. The system of claim 1 wherein the mixed polymer and blended growing media mixture is flattened upon application to the surface by man or machine rendering a pre-designed pattern.

13. The system of claim 1 wherein the surface is the subject of erosion control measures.

14. The system of claim 1 wherein the surface is a pre-prepared grid of tile like structures to be filled with the mixed polymer and blended growing media mixture in order to create an area capable of growing and capable of supporting heavy weights.

15. The system of claim 14 wherein the area is a parking lot.

16. The system of claim 14 wherein the area is a driveway.

17. The system of claim 14 wherein the area is a fire lane.

18. The system of claim 14 wherein the area is the subject of erosion control measures.

19. The system of claim 1 wherein additives enhancing growth are added to the blended growing media mixture and said additives are at least one of a fertilizer, minerals, micronutrients, an antifungal agent such as tebuconazole, simeconazole, fludioxonil, fluquinconazole, difenoconazole, 4,5-dimethyl-N-(2-propenyl)-2-(trimethylsilyl)-3-thiophenecarboxamide (silthiopham), hexaconazole, etaconazole, propiconazole, triticonazole, flutriafol, epoxiconazole, fenbuconazole, bromuconazole, penconazole, imazalil, tetraconazole, flusilazole, metconazole, diniconazole, myclobutanil, triadimenol, bitertanol, pyremethanil, cyprodinil, tridemorph, fenpropimorph, kresoxim-methyl, azoxystrobin, ZEN90160, fenpiclonil, benalaxyl, furalaxyl, metalaxyl, R-metalaxyl, orfurace, oxadixyl, carboxin, prochloraz, trifulmizole, pyrifenox, acibenzolar-5-methyl, chlorothalonil, cymoaxnil, dimethomorph, famoxadone, quinoxyfen, fenpropidine, spiroxamine, triazoxide, BAS50001, hymexazole, pencycuron, fenamidone, guazatine, and cyproconazole.

\* \* \* \* \*